United States Patent
Ki et al.

(10) Patent No.: US 8,534,578 B2
(45) Date of Patent: Sep. 17, 2013

(54) METHOD AND APPARATUS FOR RECOVERING VALUABLE METALS FROM SLAG AND MANUFACTURING MULTIFUNCTIONAL AGGREGATE

(75) Inventors: Joonseong Ki, Incheon (KR); Jinill Hwang, Incheon (KR)

(73) Assignee: Hyundai Steel Company (KR)

( * ) Notice: Subject to any disclaimer, the term of this patent is extended or adjusted under 35 U.S.C. 154(b) by 26 days.

(21) Appl. No.: 13/310,562

(22) Filed: Dec. 2, 2011

(65) Prior Publication Data

US 2012/0073406 A1 Mar. 29, 2012

Related U.S. Application Data

(63) Continuation of application No. PCT/KR2010/004150, filed on Jun. 25, 2010.

(30) Foreign Application Priority Data

Dec. 30, 2009 (KR) .................. 10-2009-0133770
Jan. 28, 2010 (KR) .................. 10-2010-0007795

(51) Int. Cl.
*B02C 23/08* (2006.01)
*B02C 23/18* (2006.01)

(52) U.S. Cl.
USPC .............................................. 241/18; 241/23

(58) Field of Classification Search
USPC ................................................... 241/18, 23
See application file for complete search history.

(56) References Cited

U.S. PATENT DOCUMENTS 3,118,778 A * 1/1964 Franz Rodis et al. ......... 106/679

FOREIGN PATENT DOCUMENTS

| JP | 52-132028 A | | 11/1977 |
|---|---|---|---|
| JP | 53-010314 A | | 1/1978 |
| JP | 60-162736 A | | 8/1985 |
| JP | 63-140044 A | | 6/1988 |
| JP | 03-117885 A | | 5/1991 |
| JP | 05-112805 A | | 5/1993 |
| JP | 08-049007 A | | 2/1996 |
| JP | 10-036148 A | | 2/1998 |
| JP | 2000-176401 A | | 6/2000 |
| JP | 2000-313907 A | | 11/2000 |
| JP | 2001233644 A | * | 8/2001 |
| JP | 2001-323327 A | | 11/2001 |
| JP | 2001323327 A | * | 11/2001 |

(Continued)

OTHER PUBLICATIONS

International Search Report dated Feb. 15, 2011 of PCT/KR2010/004150 and its English Translation (4 pages).

(Continued)

*Primary Examiner* — Kaj K Olsen
*Assistant Examiner* — Jared Wood
(74) *Attorney, Agent, or Firm* — Knobbe Martens Olson & Bear, LLP

(57) ABSTRACT

Disclosed is a method and apparatus for recovering valuable metals from slag and manufacturing multifunctional aggregate, wherein a reducing agent is fed into molten slag discharged into a slag pot or a slag reforming pot from a converter or an electric arc furnace thus recovering valuable metals from the molten slag, and then the molten slag is formed into a lightweight porous structure. Accordingly, the valuable metals (Fe, Mn) are recovered from the slag discharged from the converter or electric arc furnace, and slag having low specific gravity is ensured using foaming and controlled cooling and then formed into multifunctional aggregate.

13 Claims, 11 Drawing Sheets

(56) References Cited

FOREIGN PATENT DOCUMENTS

| | | |
|---|---|---|
| JP | 2005-219958 A | 8/2005 |
| KR | 10-2000-0021329 A | 4/2000 |
| KR | 10-2000-0042150 A | 7/2000 |
| KR | 10-2005-0032419 A | 4/2005 |

OTHER PUBLICATIONS

Written Opinion dated Feb. 15, 2011 of PCT/KR20101004150 (3 pages).

Office Action and Search Report dated Feb. 18, 2013 of corresponding Chinese Patent Application No. 201080024753.6.

* cited by examiner

METHOD AND APPARATUS FOR RECOVERING VALUABLE METALS FROM SLAG AND MANUFACTURING MULTIFUNCTIONAL AGGREGATE

RELATED APPLICATION

This application is a continuation application under 35 U.S.C. §365(c) of International Application No. PCT/KR2010/004150, filed Jun. 25, 2010 designating the United States. This application further claims the benefit of the earlier filing date under 35 U.S.C. §365(b) of Korean Patent Application No. 10-2009-0133770 filed Dec. 30, 2009, Korean Patent Application No. 10-2010-0007795 filed Jan. 28, 2010 and Korean Patent Application No. 10-2010-0007814 filed Jan. 28, 2010. This application incorporates herein by reference the International Application No. PCT/KR2010/004150 and the Korean Patent Application Nos. 10-2009-0133770, 10-2010-0007795 and 10-2010-0007814 in their entirety.

TECHNICAL FIELD

The present disclosure relates to a method of recovering valuable metals and manufacturing multifunctional aggregate from molten slag which is generated in steel-making processes using a converter, an electric arc furnace, etc.

BACKGROUND ART

Slag is a by-product generated in iron-making and steel-making processes. Slag is necessarily produced from gangues of cokes or iron ores in iron-making processes, or oxides produced during oxidation and reduction processes of molten iron or molten steel or from other additives in steel-making processes.

Slag comprises $SiO_2$ and $CaO$, and may also include $Al_2O_3$, $FeO$, $MgO$, $P_2O_5$ and $CaS$ depending on the type of refining reaction.

Iron slag is comprises $CaO$—$SiO_2$—$Al_2O_3$, and steel slag based on oxidation of molten iron or molten steel comprises $CaO$—$SiO_2$—$FeO$.

SUMMARY

Accordingly, an aspect of the present invention is to provide a method and apparatus for recovering valuable metals (Fe, Mn) and manufacturing multifunctional aggregates for utilization as cement or other specialized uses from molten slag in steel-making processes.

An aspect of the present invention provides a method of recovering a valuable metal from slag, comprising discharging molten slag into a slag pot or a slag reforming pot from a converter or an electric arc furnace, and feeding a reducing agent into the molten slag discharged into the slag pot or the slag reforming pot so that a physical chemical composition of the slag is controlled, thereby recovering the valuable metal.

The reducing agent may be one or more selected from the group consisting of carbon, aluminum, silicon, sodium, calcium, magnesium, and CO gas.

The reducing agent may be fed in at an amount which maintains a temperature of the molten slag at 1300~1600° C.

Aluminum may be fed-in an amount of 10~50 kg per 1 ton of the slag.

Another aspect of the present invention provides an apparatus for recovering a valuable metal from slag and manufacturing multifunctional aggregate, comprising a slag reforming pot for storing molten slag discharged from a converter or an electric arc furnace, a reducing agent feeder for feeding a reducing agent for recovering the valuable metal from the molten slag into the slag reforming pot, and a cooling unit for generating bubbles and performing controlled cooling so that the molten slag from which the valuable metal has been recovered is formed into a lightweight porous structure.

The reducing agent feeder may comprise a hopper for storing the reducing agent, a lance pipe extending into the slag reforming pot from the hopper so that the reducing agent is sprayed into the slag reforming pot, and a feed amount controller for calculating an amount of the reducing agent fed into the slag reforming pot via the lance pipe.

The apparatus reducing agent may be one or more selected from the group consisting of carbon, aluminum, silicon, sodium, calcium, magnesium, and CO gas.

An inoculating agent may be further fed via the reducing agent feeder so as to reform the molten slag and to lower a melting point and specific gravity of the slag. As such, the inoculating agent may be one or more selected from the group consisting of aluminum, silicon, and quicklime.

The cooling unit may comprise a steam supplier for supplying steam for cooling the molten slag to manufacture solid slag into the slag reforming pot, and a gas supplier for supplying a carrier gas for maximizing reaction between the molten slag and the reducing agent into the slag reforming pot, wherein a gas mixture of the steam and the carrier gas is introduced into the molten slag so that the slag is cooled.

The apparatus may further comprise a pressure regulator for regulating pressure of the steam and the carrier gas fed into the slag reforming pot based on positive pressure of the molten slag sensed in the slag reforming pot, so that the steam or the carrier gas is prevented from backward flow to outside of the slag reforming pot.

The steam supplier may comprise a steam nozzle provided to an inner wall or a bottom of the slag reforming pot so as to spray the steam, and a porous plug for steam formed between the steam nozzle and an outer wall of the slag reforming pot.

The gas supplier may comprise a gas nozzle provided to an inner wall or a bottom of the slag reforming pot so as to spray the carrier gas, and a porous plug for gas formed between the gas nozzle and an outer wall of the slag reforming pot.

The steam supplier and the gas supplier may respectively include a steam pipe and a gas pipe so that the steam and the carrier gas are supplied into the slag reforming pot, and the steam pipe and the gas pipe may be connected to each other so that the carrier gas and the steam are mixed and controllably supplied into the slag reforming pot.

The reducing agent feeder may comprise the gas supplier and a feed amount controller for calculating an amount of the reducing agent fed into the slag reforming pot via the gas supplier.

The feed amount controller may calculate the amount of the reducing agent able to maintain the temperature of the molten slag at 1300~1600° C.

The apparatus may further comprise a weight meter disposed under the slag reforming pot so as to measure the weight of the molten slag in the slag reforming pot, and wherein the feed amount controller may calculate the amount of the reducing agent sufficient to maintain the temperature of the molten slag at 1300~1600° C. from the weight of the molten slag measured using the weight meter.

An outlet for discharging the valuable metal recovered from the molten slag and separated into a lower portion of the slag reforming pot to outside of the slag reforming pot may be disposed on one side of the slag reforming pot.

The apparatus may further comprise a recovery device for recovering high-temperature steam generated after cooling the molten slag in the slag reforming pot, unreacted reducing agent powder in the slag reforming pot, and dust generated by reaction between the molten slag and the reducing agent.

The recovery device may selectively recover the steam and the dust.

The recovery device may include a dust collection hood spaced apart from a top of the slag reforming pot so as to suck and collect the steam and the dust.

The apparatus may further comprise a pot cover for opening or closing the top of the slag reforming pot so that the molten slag is fed into the slag reforming pot from the converter or the electric arc furnace, and a burner provided to the pot cover so that the temperature of the molten slag in the slag reforming pot is maintained or increased.

The burner may use LNG, oil and oxygen as fuel, and may further comprise fuel supply pipes formed to pass through the pot cover so that the LNG, oil and oxygen are supplied into the slag reforming pot.

The apparatus may further comprise a water cooling line disposed around an outer wall of the slag reforming pot so as to prevent thermal deformation of the slag reforming pot.

The apparatus may further comprise a tilting device for tilting the slag reforming pot so that the solid slag which has been control-cooled in the slag reforming pot is discharged to outside of the slag reforming pot.

The apparatus may further comprise a fusion preventer provided outside the slag reforming pot so that the solid slag which has been control-cooled in the slag reforming pot is prevented from being fused to the inner wall of the slag reforming pot.

The fusion preventer may be a high-frequency heater for radiating high frequency radiation onto the slag reforming pot from outside of the slag reforming pot.

The fusion preventer may be a vibration device disposed under the slag reforming pot so that small vibration is transferred to the slag reforming pot.

The fusion preventer may be a hot wire embedded between the outer wall and the inner wall of the slag reforming pot.

The apparatus may further comprise a slag pot disposed between the converter or the electric arc furnace and the slag reforming pot so that the molten slag discharged from the converter or the electric arc furnace is stored and discharged into the slag reforming pot, and wherein the reducing agent feeder may include a reducing agent feed pipe for feeding the reducing agent to the molten slag discharged into the slag reforming pot from the slag pot.

The apparatus may further comprise a slag pot disposed between the converter or the electric arc furnace and the slag reforming pot so that the molten slag discharged from the converter or the electric arc furnace is stored and discharged into the slag reforming pot, and wherein the reducing agent feeder may include a slag feed vessel disposed between the slag pot and the slag reforming pot so that the molten slag discharged from the slag pot is stored and discharged into the slag reforming pot, and a reducing agent feed pipe for feeding the reducing agent to the molten slag discharged into the slag feed vessel from the slag pot.

A further aspect of the present invention provides a method of recovering a valuable metal from slag and manufacturing multifunctional aggregate, comprising discharging molten slag into a slag pot or a slag reforming pot from a converter or an electric arc furnace, and feeding a reducing agent so as to recover the valuable metal from the molten slag, cooling the molten slag from which the valuable metal has been recovered, thus forming solid slag having a porous structure, and grinding and crushing the solid slag having a porous structure, and then forming it into aggregate.

Cooling may be performed by introducing steam and a carrier gas into the molten slag such that a cooling rate of the molten slag of 5~50° C./sec is achieved.

The steam and the carrier may be supplied at in varying amount and pressure depending on the weight and the temperature of the molten slag, and may further involve cooling, by the steam and the carrier gas, slags having particle sizes of 50 mm or less.

The cooled slag resulting from foaming and controlled cooling after reducing the valuable metal of the molten slag may have a bulk density of 0.6~3.0 g/cm$^3$.

The crushed and ground slag may be separated into slag having high specific gravity and slag having low specific gravity using flotation gravity separation.

According to embodiments of the present invention, a reducing agent is used so that valuable metals (Fe, Mn) can be recovered to the level of 20% from slag discharged from a converter or an electric arc furnace. Hence, the amount of slag can be decreased, and the recovered valuable metals (Fe, Mn) can be reused, and thus embodiments of this invention are favorable in terms of costs.

Also according to embodiments of the present invention, the valuable metals can be stably recovered without the generation of dust, thanks to the use of the reducing agent. Thus, natural environments can be effectively conserved.

Also according to embodiments of the present invention, slag having low specific gravity can be produced using foaming and controlled cooling after the reducing process, which may subsequently be manufactured into multifunctional aggregate. Such multifunctional aggregate has a composition similar to that of natural aggregate or cement, and can thus be substituted for multifunctional lightweight aggregate made for special applications such as interlayer noise prevention materials of buildings that require low expansibility. The composition of such multifunctional aggregate can also be adapted to make cement.

Also, because the multifunctional aggregate obviates an additional burning process, the use of fuel and power consumption in making cement can be reduced. Furthermore, cement production from such multifunctional aggregate can lower the $CO_2$ emission by about 40%, compared to conventional cement production processes.

Also, the multifunctional aggregate has superior chemical resistance and high penetration resistance to chloride ions. Furthermore, the multifunctional aggregate can effectively suppress ASR (Alkali Silica Reaction) and thus can be utilized as a cement material for concrete constructions having high durability.

Therefore, embodiments of the present invention can provide utilization of slag as high-quality cement, lightweight aggregate, and admixture materials and is environmentally friendly and thus can contribute to solving the unstable supply and demand of building materials, and is favorable in terms of costs because the valuable metals contained in the slag can be recovered.

Figure 1:
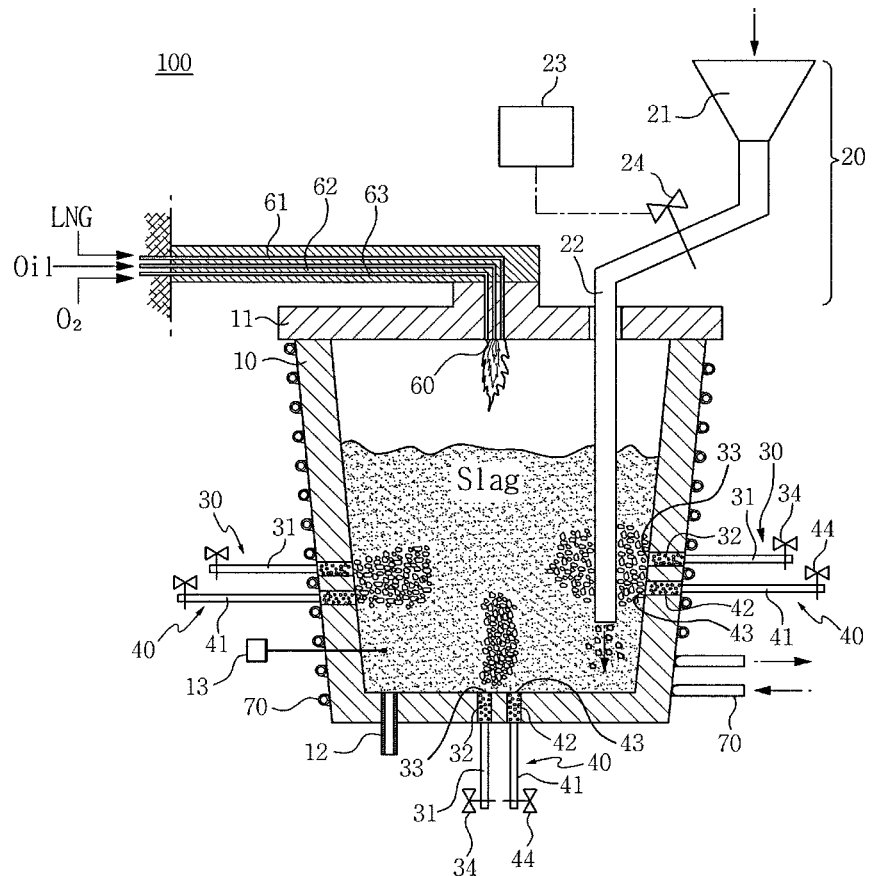
FIG. 1 shows an apparatus for recovering valuable metals from slag and manufacturing multifunctional aggregate according to an embodiment of the present invention.

DESCRIPTION OF THE REFERENCE NUMERALS IN THE DRAWINGS 10, 130, 230, 330: slag reforming pot
20, 220, 320: reducing agent feeder
30: steam supplier
40: gas supplier
50: weight meter
60: burner
70: water cooling line
80: fusion preventer
90: recovery device
100: apparatus for recovering valuable metals from slag and manufacturing multifunctional aggregate Embodiments Hereinafter, a detailed description will be given of embodiments of the present invention with reference to the appended drawings.

Figure 2:
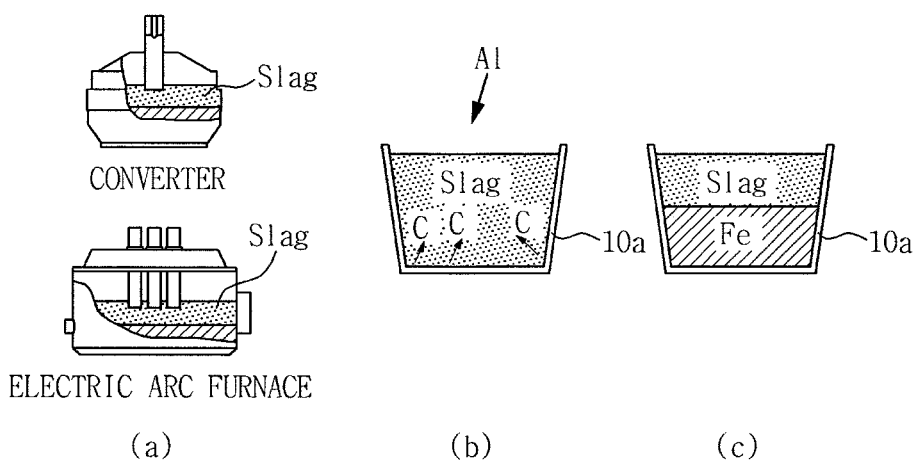
FIG. 2 shows a process of recovering the valuable metals using a slag pot.
Figure 3:
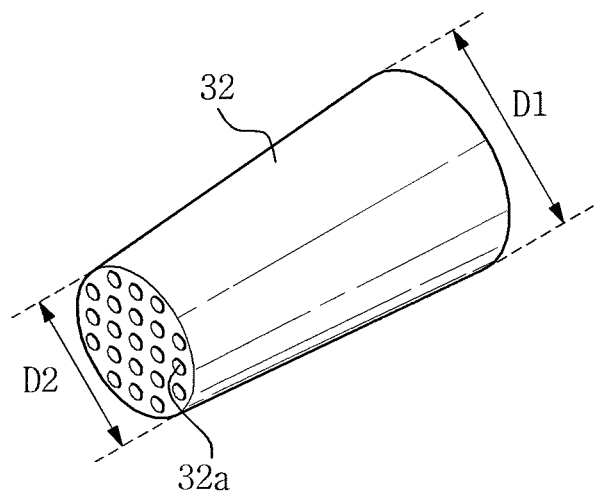
FIG. 3 shows a perspective view of a porous plug for steam in FIG. 1.

FIG. 1 shows an apparatus for recovering valuable metals from slag and manufacturing multifunctional aggregate according to an embodiment of the present invention, FIG. 2 shows a process of recovering the valuable metals using a slag pot, and FIG. 3 shows a perspective view of a porous plug for steam of FIG. 1.

According to embodiments of the present invention, a method of recovering valuable metals and manufacturing multifunctional aggregate using an apparatus 100 for recovering valuable metals from slag and manufacturing multifunctional aggregate includes discharging molten slag into a slag reforming pot 10 as shown in FIG. 1 from a converter or an electric arc furnace as shown in FIG. 2, and subsequently feeding a reducing agent to recover valuable metals from the molten slag.

As mentioned above, the molten slag is discharged into the slag reforming pot 10 as shown in FIG. 1 from the converter or the electric arc furnace, and the reducing agent is fed so that the valuable metals contained in the molten slag may be recovered. Alternatively, the molten slag may be placed into a slag pot 10a as shown in FIG. 2 from the converter or the electric arc furnace, and the reducing agent may be added into the slag pot 10a, thus enabling the valuable metals contained in the molten slag to be recovered.

The slag pot 10a is disposed between the converter or the electric arc furnace and the slag reforming pot 10 so that the molten slag discharged from the converter or the electric arc furnace is stored and discharged into the slag reforming pot 10, and recovering the valuable metals may be performed in either the slag reforming pot 10 or the slag pot 10a.

The reducing agent, comprising one or more selected from the group consisting of carbon (C), aluminum (Al), silicon (Si), sodium (Na), calcium (Ca), magnesium (Mg) and CO gas, each of which has high oxygen affinity, is fed into the slag pot 10a, and the amount thereof may be set in the range that enables the temperature of the molten slag to be maintained at 1300~1600° C. Also, aluminum which is the reducing agent may be added in the amount of 10~50 kg per 1 ton of the slag. The reason for maintaining the temperature of the molten slag at 1300~1600° C. and the reason for the required amount of added aluminum will be described later.

Figure 13:
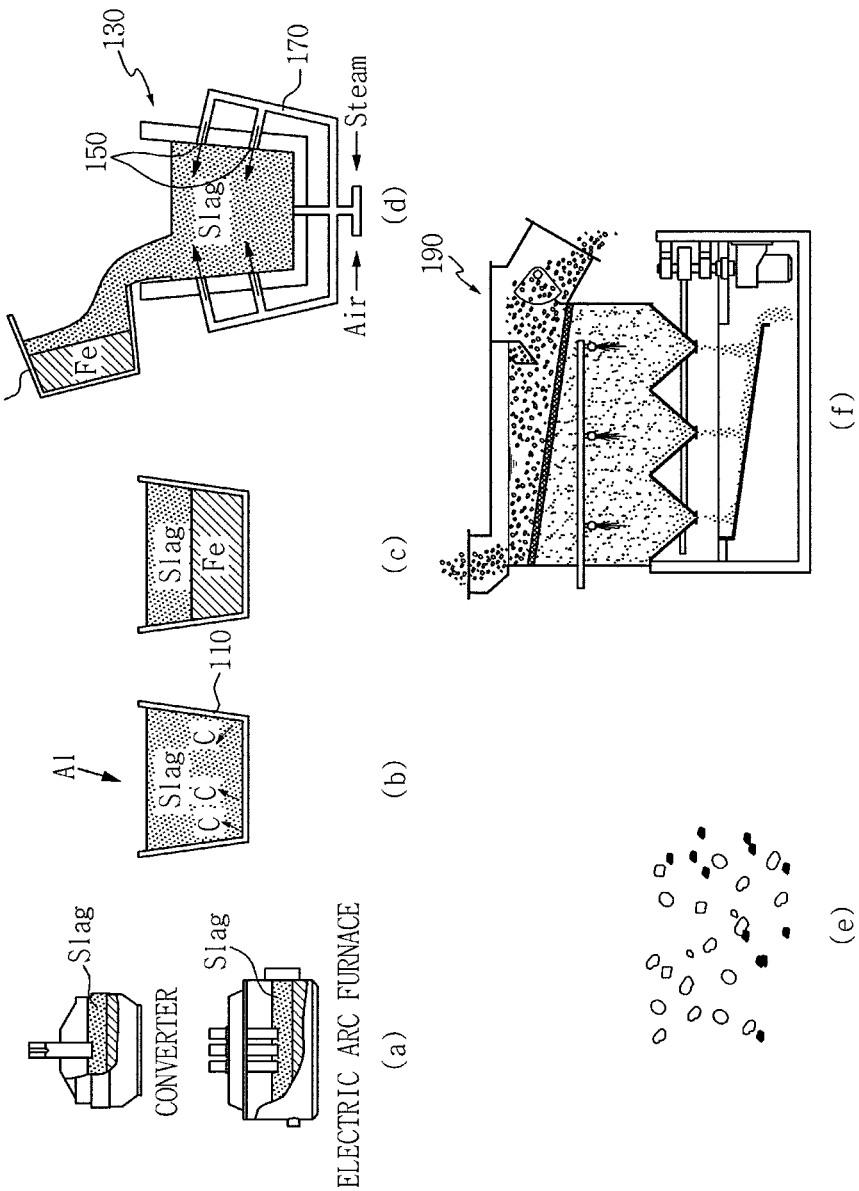
FIG. 13 shows a work process using another example of an apparatus for recovering valuable metals from slag and manufacturing multifunctional aggregate.

Also, recovering the valuable metals using the reducing agent is performed in the slag pot, after which the molten slag of the upper portion of the slag pot is discharged into the slag reforming pot and is then subjected to controlled cooling, which will be described later in the second embodiment as shown in FIG. 13.

In embodiments of the present invention, the reducing agent is added into the molten slag within the slag reforming pot 10, thereby recovering the valuable metals from the molten slag. Subsequently, in order to form a lightweight porous structure, the molten slag from which the valuable metals have been recovered is bubbled and controllably cooled, thereby obtaining solid slag having a porous structure, which is subsequently ground and crushed, which is in turn subsequently formed into multifunctional aggregates. Such multifunctional aggregates have a composition similar to that of natural aggregate or cement and may thus be utilized as high-quality cement, lightweight aggregate, and admixture, and in particular may have specialized end uses because of their low specific gravity and low moisture absorption.

The present process for recovering the valuable metals and manufacturing the multifunctional aggregate using the above method is called a KH (Ki-Hwang) process.

Regarding the recovery of the valuable metals from the slag, the slag produced in the converter or the electric arc furnace contains large amounts of valuable metal oxides, such as FeO.

The chemical composition of the steel slag in the steelmaking process using the electric arc furnace has been analyzed as shown in Table 1 below.

TABLE 1

|  | $SiO_2$ | $Al_2O_3$ | T.Fe | CaO | MgO | MnO | $P_2O_5$ | T/S | (unit: wt %)<br>$CaO/SiO_2$ |
|---|---|---|---|---|---|---|---|---|---|
| Meltdown in Electric Arc Furnace | 18.30 | 11.11 | 22.36 | 20.12 | 8.41 | 5.81 | 0.241 | 0.123 | 1.11 |
| End of Oxidation Refining in Electric Arc Furnace | 19.29 | 11.39 | 19.02 | 22.12 | 8.61 | 6.28 | 0.213 | 0.100 | 1.14 |
| Arrival at LF | 26.59 | 8.03 | 1.88 | 37.95 | 16.18 | 4.64 | 0.033 | 0.332 | 1.44 |
| Discharge from LF | 26.44 | 6.92 | 0.58 | 48.05 | 13.18 | 0.84 | 0.024 | 0.785 | 1.83 |

The steel slag generated in the converter or the electric arc furnace contains at least 20% of valuable metal oxides, and in particular initial slag of the electric arc furnace contains at least 30% of valuable metal oxides.

A typical example of the valuable metal oxides contained in the slag is FeO. If the amount of FeO is high, the slag is difficult to crush when manufactured into aggregate, and is difficult to be made in the form that can be used as cement. For this reason, the valuable metals contained in the slag are recovered first to reduce the FeO content, after which the slag is controllably cooled so that the slag may more easily be converted into a lightweight porous structure.

Below, as an illustration only, an embodiment of the present invention is described using the slag produced in the electric arc furnace.

According to the embodiment of the present invention, the apparatus 100 for recovering valuable metals and manufacturing multifunctional aggregate comprises a slag reforming pot 10, a reducing agent feeder 20 and cooling units 30, 40.

The discharging of the slag from the electric arc furnace starts prior to reduction refining but subsequent to the completion of oxidation refining, sometime after the midpoint of the oxidation refining. Choosing the appropriate time for discharging the slag is important because the amount of metal oxides in the slag is decreased toward the end of oxidation refining, thus reducing the fluidity of the slag, and making it difficult to discharge the slag.

The slag is first discharged into an additional slag pot 10a (FIG. 2) by tilting the electric arc furnace or opening a door if there is the door, after which the molten slag is charged into the slag reforming pot 10. As shown in FIG. 1, however, embodiments of the present invention make it possible to directly discharge the slag into the slag reforming pot 10 from the electric arc furnace, without passing through the slag pot 10a (FIG. 2).

The inner wall of the slag reforming pot 10 is made of a copper plate or an iron plate having high heat conductivity, and a pot cover 11 is provided on the slag reforming pot 10 to open or close the top of the slag reforming pot 10 so that the molten slag discharged from the converter or the electric arc furnace is fed into the slag reforming pot 10.

When the molten slag discharged from the converter or the electric arc furnace is stored in the slag reforming pot 10, the reducing agent for recovering the valuable metals from the molten slag is fed into the slag reforming pot 10 via the reducing agent feeder 20.

Specifically, the reducing agent feeder 20 includes a hopper 21 for storing the reducing agent, a lance pipe 22 extending into the slag reforming pot 10 from the hopper 21 so that the reducing agent is sprayed into the slag reforming pot 10, and a feed amount controller 23 for calculating the amount of the reducing agent fed into the slag reforming pot 10 via the lance pipe 22.

Below, feeing the reducing agent to the molten slag discharged into the slag reforming pot 10 is described.

The reducing agent is used to reduce the valuable metal oxides of the molten slag, in particular, FeO, into Fe. Examples of the reducing agent include carbon (C), aluminum (Al), etc., each of which has high oxygen affinity, and in addition, one or more selected from among silicon (Si), sodium (Na), calcium (Ca), magnesium (Mg) and CO gas may be used.

The reducing agent comprising one or more selected from the group consisting of carbon (C), aluminum (Al), silicon (Si), sodium (Na), calcium (Ca), magnesium (Mg) and CO gas is supplied into the slag reforming pot 10 via the reducing agent feeder 20.

As such, in order to enhance the stirring force to increase the reaction rate, a carrier gas may be fed along with the reducing agent. The carrier gas may be air, nitrogen or argon gas, and is supplied into the slag reforming pot 10 via a gas supplier 40 which will be described later.

Aluminum (Al) is used to strongly reduce iron (Fe).

Reducing iron (Fe) contained in the molten slag favorably occurs in proportion to the increase in the temperature of the molten slag and the reaction rate. However, because the reduction of iron (Fe) by carbon (C) is endothermic, the temperature of the molten slag is lowered.

The temperature of the molten slag is about 1600° C. upon discharge, but is subsequently lowered by about 200~300° C. within about 1 hour after the molten slag is discharged due to the reduction of iron (Fe) by carbon (C) and other external factors.

In order to maintain the molten slag at high temperature, an additional heat source is required. However, when aluminum (Al) is used as the reducing agent, aluminum (Al) oxidation energy is produced. The reduction of iron (Fe) by aluminum (Al) is represented by the reaction $3FeO+2Al \rightarrow 3Fe+Al_2O_3$ ($\Delta H=-187.1$ kcal), which is exothermic. Because this reaction generates heat upon reduction, it is called the Thermit reaction.

The amount of aluminum (Al) fed is controlled in the range in which the temperature of the molten slag is maintained at 1300~1600° C. The iron (Fe) is favorably reduced in proportion to an increase in the temperature of the molten slag. On the one hand, if the temperature of the molten slag exceeds 1600° C., the slag pot may excessively corrode. On the other hand, if this temperature is lower than 1300° C., the reduction reaction may drastically deteriorate.

Specifically, when the molten slag is discharged into the slag pot from the electric arc furnace, the fed carbon (C) functions as the reducing agent, so that the reduction progresses: $FeO+C \rightarrow Fe+CO$.

In this procedure, the temperature of the molten slag may be lowered, but when aluminum (Al) is subsequently added, the reaction progresses: $3FeO+2Al \rightarrow 3Fe+Al_2O_3$ (−187.1 kcal), which is exothermic, so that the temperature of the molten slag is maintained high, thereby promoting the reduction. $Al_2O_3$ produced by the reduction causes the composition of the slag to change, and lowers the melting point.

The amount of aluminum (Al) necessary for maintaining the temperature of the molten slag at 1300~1600° C. is 10~50 kg per 1 ton of the slag. The amount of aluminum (Al) is obtained by setting the actual yield of aluminum (Al) to 50~100% depending on the operation conditions.

The amount of aluminum (Al) is calculated depending on the following reaction and the amount of heat.

$$3FeO+2Al \rightarrow 3Fe+Al_2O_3 \ (\Delta H=-187.1 \text{ kcal})$$

$$Q=C \times M \times T$$

where Q represents the amount of generated heat, C represents the heat capacity of slag, M represents the weight of slag, and T represents the heating temperature.

For example, if the weight of the slag is 10 tons and the amount of FeO of the slag is 1 ton, aluminum (Al) is added in an amount of 251 kg.

The calculation procedure is as follows:
Al that reacts with 1 mole FeO is ⅔ mole
1 mole FeO=71.8 g
FeO 1 ton=1000000/71.8=13928 mole
Al that reacts with 13928 mole FeO is 9285 mole
9285 mole Al→9285 mole×27 g/mole=251 kg The amount of FeO of the molten slag may be measured using a spectrometer or a wet process.

As mentioned above, the amount of aluminum (Al) for maintaining the temperature of the molten slag at 1300~1600° C. is 10~50 kg per 1 ton of the slag. In order to feed such an appropriate amount of the reducing agent, the amount of the reducing agent able to maintain the temperature of the molten temperature at 1300~1600° C. is calculated by means of the feed amount controller 23.

To this end, the feed amount controller 23 calculates the amount of the reducing agent able to maintain the temperature of the molten slag in the range of 1300~1600° C. from the weight of the molten slag measured using a weight meter 50 (FIG. 5) disposed under the slag reforming pot 10 to measure the weight of the molten slag in the slag reforming pot 10.

For example, when the weight of the molten slag measured using the weight meter 50 (FIG. 5) is 1 ton, the amount of aluminum (Al) which is the reducing agent is calculated to be 10~50 kg by means of the feed amount controller 23, and the control valve 24 on the pipe is regulated, whereby the calculated amount of the reducing agent (Al) is fed into the slag reforming pot 10 via the lance pipe 22 from the hopper 21.

Table 2 below shows the rate of recovery of slag relative to the amount of fed aluminum (Al).

On the other hand, an inoculating agent may be further fed via the reducing agent feeder 20 so as to lower the melting point and the specific gravity of the molten slag and to reform the slag.

Specifically, the inoculating agent may be added before the controlled cooling in order to lower the melting point and the specific gravity of the molten slag and to reform the slag. The inoculating agent changes the physical chemical composition of the molten slag so that the foaming of the molten slag occurs at 1300° C. or higher, thus resulting in a lower melting point and a lower specific gravity.

The molten slag has a specific gravity of 3.0 g/cm³ or less. As such, the specific gravity of the molten slag is decreased by the combined action of factors for the recovery of FeO into Fe with the addition of the inoculating agent.

This principle is that when the inoculating agent is fed, a low-melting-point oxide is formed by oxidation, and when the molten slag is cooled by the steam and the carrier gas, the volume expands, ultimately resulting in a lower specific gravity of the slag. Furthermore, the melting point of the molten slag is also lowered by the low-melting-point oxide.

The inoculating agent may be one or more selected from the group consisting of aluminum, silicon, and quicklime.

Aluminum, silicon, or quicklime is fed in an amount of 400 kg or less per 1 ton of the slag. As such, aluminum and silicon function to decrease the specific gravity and the melting point of the molten slag in proportion to the increase in the amounts thereof. However, if this component is excessively added, it takes the heat away from the molten slag before the reaction, thus solidifying the slag. Hence, the amount of inoculating agent should not exceed 400 kg per 1 ton of the slag. This is because the reaction for decreasing the melting point and the specific gravity is possible only when the slag is in a molten state.

According to embodiments of the present invention, the apparatus 100 for recovering valuable metals and manufacturing multifunctional aggregate further comprises a burner 60, which is provided to the pot cover 11 to maintain or increase the temperature of the molten slag so as to achieve the efficient reaction between the molten slag and the reducing agent or the inoculating agent. When the temperature of the molten slag is maintained at a constant using the burner 60, the reactivity between the molten slag and the reducing agent or the inoculating agent may be kept at a predetermined level or higher.

The burner 60 may use LNG, oil, and oxygen as fuel. According to embodiments of the present invention, the apparatus 100 for recovering valuable metals and manufacturing multifunctional aggregate further comprises fuel supply pipes 61, 62, 63 formed to pass through the pot cover 11 so as to supply the LNG, oil and oxygen into the slag reforming pot 10. With reference to FIG. 1, the reference numeral 61 designates the LNG supply pipe, the reference numeral 62 des-

TABLE 2

|   | Amount of Slag | Amount of FeO in Slag | Reducing Agent C | Reducing Agent Al | Slag Temp. (after 1 hour) | Rate of Recovery of Fe | Note |
|---|---|---|---|---|---|---|---|
| 1 | 1 ton | 100 kg | supply | 6 kg | 1250~1350° C. | 1~3% | Comparative |
| 2 | 1 ton | 100 kg | from | 9 kg | 1270~1370° C. | 3~5% | Comparative |
| 3 | 1 ton | 100 kg | graphite | 25 kg | 1300~1400° C. | 18~21% | Inventive |
| 4 | 1 ton | 100 kg | crucible | 45 kg | 1400~1500° C. | 19~22% | Inventive |

As is apparent from Table 2, the rate of recovery of valuable metal Fe is as high as about 20%. According to the above method, the valuable metals can be stably recovered without the generation of dust.

ignates the oil supply pipe, and the reference numeral 63 designates the oxygen supply pipe.

Within one to two hours of the feeding aluminum (Al), the reduction is completed.

After the completion of the reduction, iron (Fe) having high specific gravity is separated into the lower portion of the slag reforming pot 10 whereas the molten slag is positioned at the upper portion thereof.

Before controlled cooling of the molten slag after completion of the reduction, in order to increase the controlled cooling efficiency and manufacture the molten slag into solid slag having a porous structure, the valuable metal (Fe) recovered from the molten slag and separated into the lower portion of the slag reforming pot 10 should be discharged to the outside of the slag reforming pot 10, which is performed via an outlet 12 formed at one side of the slag reforming pot 10. As shown in FIG. 1, the outlet 12 may be disposed in the bottom of the slag reforming pot 10.

In embodiments of the present invention, the cooling units 30, 40 play a role in controllably cooling the molten slag in the slag reforming pot 10 in order to form the molten slag from which valuable metals have been recovered into a lightweight porous structure.

As such, an additive may be further added before cooling of the molten slag. The additive may be used to manufacture the molten slag into a cement component.

The cooling units 30, 40 comprise a steam supplier 30 for supplying steam for cooling the molten slag and manufacturing the solid slag into the slag reforming pot 10 and a gas supplier 40 for supplying a carrier gas for maximizing the reaction between the molten slag and the reducing agent into the slag reforming pot 10, and the controlled cooling is performed by introducing a gas mixture of the steam and the carrier gas into the molten slag.

Specifically, the steam supplier 30 includes a steam nozzle 33 provided to the inner wall or the bottom of the slag reforming pot 10 so as to spray steam, and a porous plug 32 for steam and a steam pipe 31 formed between the steam nozzle 33 and the outer wall of the slag reforming pot 10.

With reference to FIG. 1, a plurality of steam nozzles 33 for spraying steam are provided to the inner wall or the bottom of the slag reforming pot 10, and the steam nozzles 33 are respectively connected to steam pipes 31 so as to communicate therewith. Also, flow rate regulators 34 for regulating the amount and the pressure of steam are provided on the steam pipes 31. Although not shown, the steam pipes 31 may be provided with discharge pipes for discharging condensed water produced due to heat loss of the steam.

The porous plugs 32 for steam are formed of a porous refractory composed mainly of aluminum oxide, and as shown in FIG. 3, a plurality of holes 32a may be irregularly arranged. The holes 32a are irregularly formed not only on the surface of the porous plugs 32 but also in the porous plugs 32, so that the gas or solid reducing agent transferred from the steam pipes 31 may pass therethrough.

With reference to FIG. 3, the outer diameter of the porous plug 32 for steam exposed on the outer wall of the slag reforming pot 10 is smaller compared to the inner diameter exposed on the inner wall of the slag reforming pot 10 (in FIG. 3, D1>D2). As a result, even when the internal pressure of the slag reforming pot 10 is increased, the steam fed into the slag reforming pot 10 may be prevented from backward flow to the steam pipes 31.

In addition to the above porous plugs, the steam may be fed into the slag reforming pot 10 using a variety of feed pipes or iron pipes.

Also, a pressure regulator 13 may be further provided, so that the pressure of the steam and the carrier gas which are fed into the slag reforming pot 10 is regulated based on the positive voltage of the molten slag sensed in the slag reforming pot 10, thereby preventing the steam or the carrier gas from backward flow to the outside of the slag reforming pot 10.

The pressure regulator 13 includes a sensor for sensing the positive pressure of the molten slag in the slag reforming pot 10, and a control part for controlling the pressure of the steam or the carrier gas fed into the slag reforming pot 10 based on the positive pressure.

Specifically, if the positive pressure of the molten slag in the slag reforming pot 10 is increased, the steam or the carrier gas fed into the slag reforming pot 10 may backward flow to the steam pipes 31 or the gas pipes 41. In this case, in order to prevent the backward flow, the pressure regulator 13 automatically regulates the pressure of the steam and the carrier gas to be fed into the slag reforming pot 10.

To this end, the positive pressure of the molten slag in the slag reforming pot 10 is sensed by a predetermined sensor. If the sensed positive pressure is equal to or more than predetermined pressure, the pressure of the steam and the carrier gas is increased by the control part of the pressure regulator 13, so that the positive pressure is overcome and thus the steam and the carrier gas are efficiently fed into the slag reforming pot 10.

Although not shown, in lieu of using the holes 32a of the porous plug 32 for steam, it is possible to employ the configuration in which a plurality of fine pipes made of one selected from among copper (Cu), iron (Fe) and stainless steel are connected to the steam pipes 31 so that the steam is sprayed into the slag reforming pot 10 via the plurality of fine pipes.

The configuration of the gas supplier 40 is very similar to the configuration and function of the steam supplier 30. The gas supplier 40 includes gas nozzles 43 provided to the inner wall or the bottom of the slag reforming pot 10 to spray the carrier gas, porous plugs 42 for gas and gas pipes 41 formed between the gas nozzles 43 and the outer wall of the slag reforming pot 10. The carrier gas may include air, nitrogen or argon gas.

The plurality of gas nozzles 43 for spraying the carrier gas are formed at the inner wall and the bottom of the slag reforming pot 10, and the gas nozzles 43 are connected to the gas pipes 41 so as to communicate therewith. Also, flow rate regulators 44 for regulating the amount and pressure of gas to be fed are provided on the gas pipes 41.

The configuration and function of the porous plug 42 for gas are similar to those of the porous plug 32 for steam, and a description thereof is omitted.

As mentioned above, when the steam and the carrier gas are fed into the slag reforming pot 10 via the steam supplier 30 and the gas supplier 40 respectively, the flow rate and pressure of the steam and the carrier gas may be separately controlled.

However, the present invention is not limited thereto, and the steam pipes of the steam supplier and the gas pipes of the gas supplier for supplying the steam and the gas into the slag reforming pot may be connected to each other, so that the gas and the steam may be mixed together and thus control-supplied into the slag reforming pot.

Figure 4:
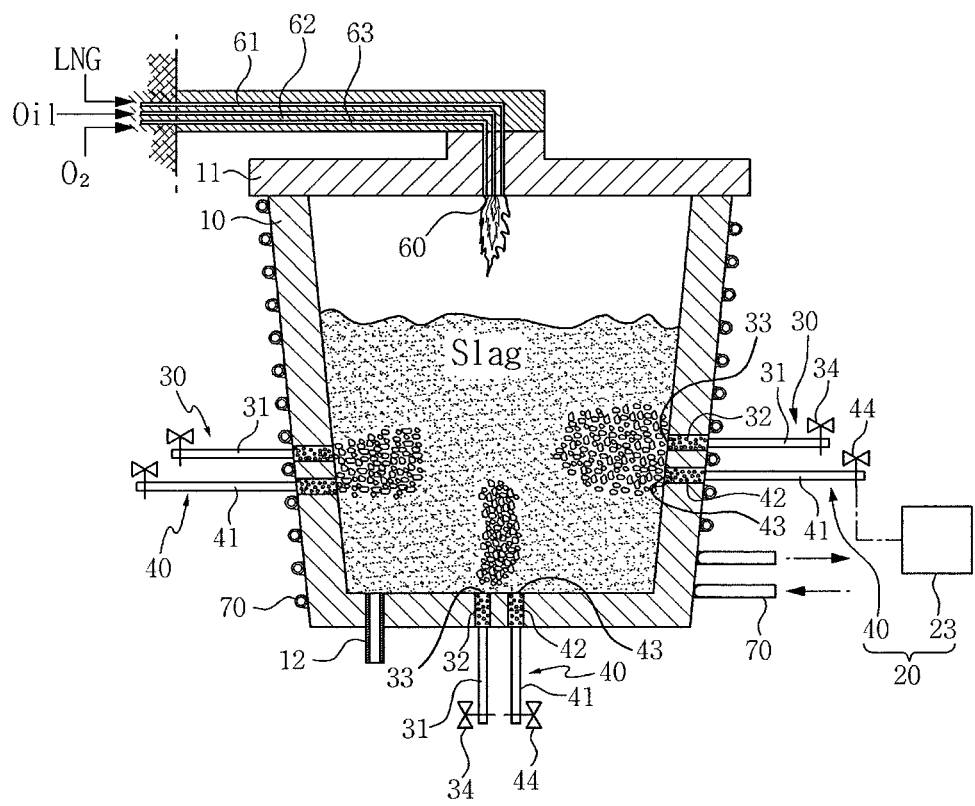
FIG. 4 shows an apparatus for recovering valuable metals from slag and manufacturing multifunctional aggregate according to another embodiment of the present invention.
Figure 5:
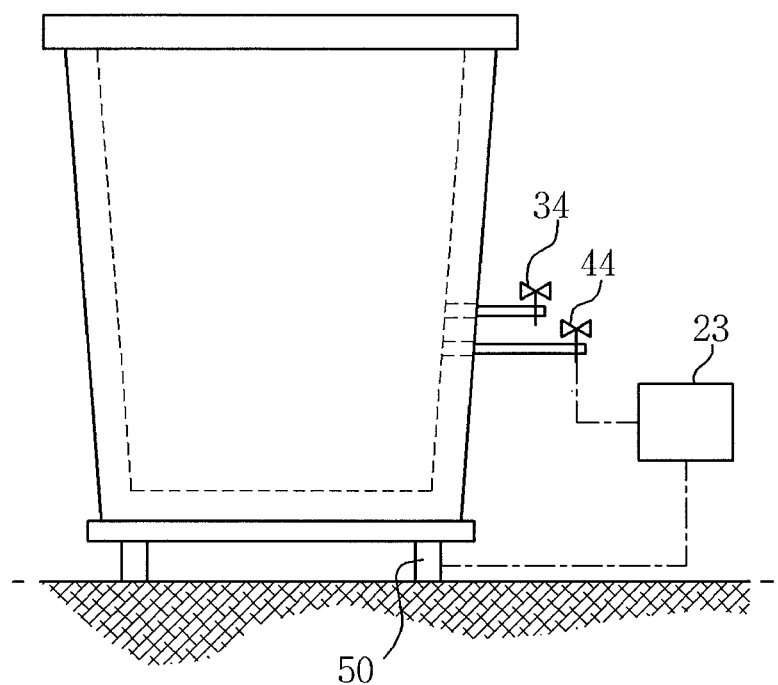
FIG. 5 shows an example of a reducing agent feeder of the apparatus for recovering valuable metals and manufacturing multifunctional aggregate of FIG. 4.

FIG. 4 shows an apparatus for recovering valuable metals from slag and manufacturing multifunctional aggregate according to another embodiment of the present invention, and FIG. 5 shows the reducing agent feeder of the apparatus recovering valuable metals and manufacturing multifunctional aggregate of FIG. 4.

In contrast to the reducing agent feeder 20 shown in the embodiment in FIG. 1 which includes the hopper 21, the lance pipe 22 and the feed amount controller 23, the reducing agent feeder 20 shown in the embodiment in FIG. 4 may include a gas supplier 40 and a feed amount controller 23 for calculating the amount of the reducing agent fed into the slag reforming pot 10 via the gas supplier 40.

Unlike the embodiment of FIG. 1, the reducing agent may be fed along with the carrier gas via the gas supplier 40 in this embodiment.

In this case, with reference to FIG. 5, the feed amount controller 23 calculates the amount of the reducing agent able to maintain the temperature of the molten slag at 1300~1600° C. based on the weight of the molten slag measured using the weight meter 50, and the calculated amount of the reducing agent is fed into the slag reforming pot 10 using the flow rate regulator 44 provided on the gas pipe 41. The weight meter 50 may include an electronic scale comprising load cells, and in addition, in order to measure the weight, any type of scale may be applied.

When controlled-cooling is performed by introducing the gas mixture of the steam and the carrier gas into the molten slag, the molten slag having lowered specific gravity and lowered melting point is cooled in a manner in which bubbles are formed within the molten slag. The resulting solid slag has a porous structure, and can be easily crushed without having to apply a large force.

If the molten slag is typically treated with water cooling or air cooling in lieu of the controlled cooling according to embodiments of the present invention, the slag product has a large amount of Fe and is thus difficult to crush, and also cannot be used as a cement material because of a high specific gravity of 3.5 g/cm$^3$ or more and expansibility due to phase transformation of f-CaO and f-MgO.

The solid slag having a porous structure resulting from foaming and controlled-cooling after reduction has a bulk density of 0.6~3.0 g/cm$^3$. The bulk density means a density which takes into account of the empty volume between the materials and is also called the volume density.

On the one hand, if the bulk density is less than 0.6 g/cm$^3$, the resulting product does not effectively sound-proof floors of buildings when used as lightweight aggregate for buildings. On the other hand, if the bulk density is more than 3.0 g/cm$^3$, the resulting product is difficult to use as a material for cement.

The steam is fed to cool the slag and the carrier gas is fed to stir the molten slag and the reducing agent. The steam decreases the temperature of the slag and may exhibit superior cooling efficiency because of low expansion capability. For reference, water has large expansion capability and may cause a danger of explosion, and is not applied to cool the high-temperature molten slag.

The cooling may be performed at a cooling rate of 1~50° C./sec up to room temperature. The cooling rate has a maximum value and a minimum value depending on the feed amount and pressure of steam and carrier gas at room temperature, and the shape, strength and tissue density of solid slag may vary depending on the cooling rate.

Table 3 below shows the maximum value and the minimum value of the cooling rate depending on the feed amount and pressure of the gas and the steam.

TABLE 3

| | Molten Slag Temp. (° C.) | Cooled Slat Temp. (° C.) | Cooling Time (s) | Cooling Rate (° C./sec) |
| --- | --- | --- | --- | --- |
| 1 | 1400 | 100 | 26 | 50 (maximum) |
| 2 | 1400 | 100 | 1800 | 1 (minimum) |

As is apparent from Table 3, the cooling rate can have the maximum value and the minimum value depending on the feed amount and pressure of steam and gas at room temperature.

Table 4 below shows the particle size of the crushed solid slag having a porous structure depending on the cooling rate.

TABLE 4

| | Cooling Rate (° C./sec) | Particle Size of Cooled Solid Slag (mm) |
| --- | --- | --- |
| 1 | 1~5 | 40~70 |
| 2 | 5~20 | 15~50 |
| 3 | 20~35 | 5~20 |
| 4 | 15~50 | 1~10 |

As is apparent from Table 4, in the case where the cooling rate is maintained at 5~50° C./sec, the solid slag can have a particle size of 50 mm or less. Here, the particle size refers to the initial particle size after crushing.

As seen in Tables 3 and 4, the slag having a particle size of 50 mm and low specific gravity can be ensured by foaming, controlled cooling and crushing after reduction.

Based on the data shown in Tables 3 and 4, the feed amount and pressure of steam and gas at room temperature are regulated so that the cooling rate is maintained at 5~50° C./sec. This is to increase the crushing efficiency of the solid slag. If the cooling rate is 5° C./sec or more, the average particle size of the slag is 50 mm or less, thus exhibiting high crushing efficiency. The upper limit of the cooling rate may include the maximum value depending on the feed amount and pressure of steam and carrier gas at room temperature.

According to embodiments of the present invention, the apparatus 100 for recovering valuable metals and manufacturing multifunctional aggregate further comprises a water cooling line 70 for preventing the thermal deformation of the slag reforming pot 10.

Thermal stress that is repetitively applied into the slag reforming pot 10 from the high-temperature molten slag causes thermal deformation of the slag reforming pot 10.

In order to prevent the thermal deformation, water at room temperature is fluidized via the water cooling line 70 disposed around the outer wall of the slag reforming pot 10, so that the slag reforming pot 10 may be prevented from thermal deformation.

Figure 6:
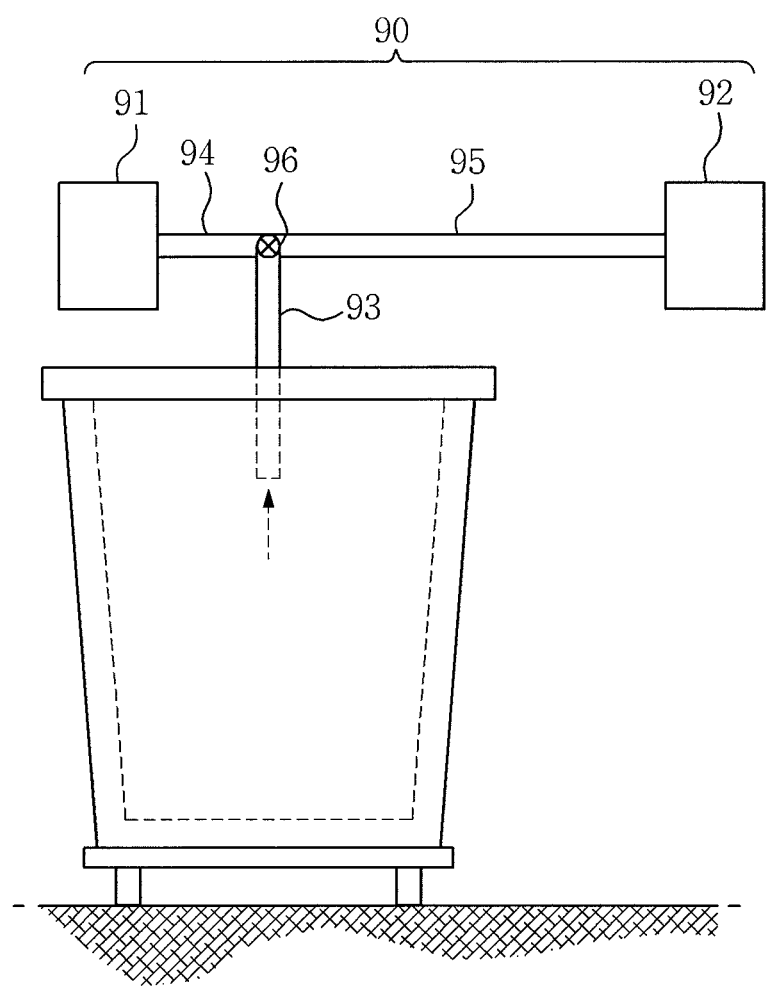
FIG. 6 shows a first example of a recovery device of the apparatus for recovering valuable metals and manufacturing multifunctional aggregate of FIG. 1.

FIG. 6 shows a first example of a recovery device of the apparatus for recovering valuable metals and manufacturing multifunctional aggregate of FIG. 1.

According to the embodiment of the present invention, the apparatus 100 for recovering valuable metals and manufacturing multifunctional aggregate further comprises the recovery device 90 for recovering the high-temperature steam generated after cooling the molten slag in the slag reforming pot 10, the unreacted reducing agent powder in the slag reforming pot, and the dust generated upon the reaction between the molten slag and the reducing agent.

The recovery device 90 includes a steam storage part 91 and a dust recovery part 92 respectively for recovering and storing the high-temperature steam and the dust (including the unreacted reducing agent powder), a common pipe 93, a steam pipe 94, a dust pipe 95 and a regulator 96.

Specifically, the molten slag is cooled in the slag reforming pot 10, after which the high-temperature steam is generated and is then discharged to the outside of the slag reforming pot 10 via the common pipe 93. Similarly, when the dust is generated by the reaction between the molten slag and the reducing agent, the dust is discharged to the outside of the slag reforming pot 10 via the common pipe 93.

With reference to FIG. 6, the steam and the dust fed into the common pipe 93 are respectively guided into the steam storage part 91 and the dust recovery part 92.

Specifically, the high-temperature steam is generated when molten slag is cooled, and the dust is generated upon the reaction between the molten slag and the reducing agent, and the points of time at which the steam and the dust are generated are different from each other.

In regard to respective points of time, upon the reaction between the molten slag and the reducing agent, the dust is guided toward the dust pipe 95 by means of the regulator 96 and thus collected so that the dust passed through the common pipe 93 is guided into the dust recovery part 92.

Also upon controlled-cooling of the molten slag, the high-temperature steam is guided toward the steam pipe 94 using the regulator 96 and thus collected so that the steam passed through the common pipe 93 is guided into the steam recovery part 91. The regulator 96 may include a directional valve such as a solenoid valve.

The recovery device 90 enables the high-temperature steam generated after cooling the molten slag in the slag reforming pot 10 and the dust generated from the reaction between the molten slag and the reducing agent to be selectively recovered using the regulator 96.

As mentioned above, the heat of the high-temperature steam guided into the steam storage part 91 is recovered and recycled, thereby increasing the efficiency, and the dust guided into the dust recovery part 92 is collected, thus preventing the discharge of contaminants.

Figure 7:
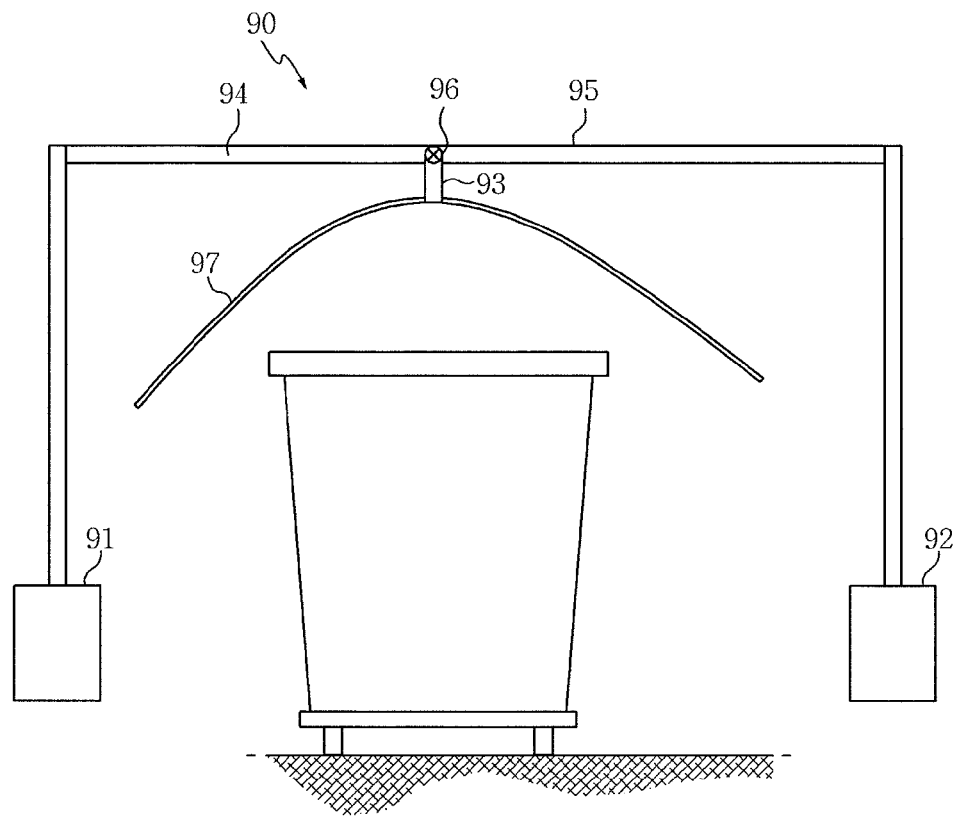
FIG. 7 shows a second example of a recovery device of the apparatus for recovering valuable metals and manufacturing multifunctional aggregate of FIG. 1.

FIG. 7 shows a second example of the recovery device of the apparatus for recovering valuable metals and manufacturing multifunctional aggregate of FIG. 1.

The recovery device 90 of FIG. 7 may include a dust collection hood 97 spaced apart from the top of the slag reforming pot 10 to suck and collect the steam and the dust.

Thus, the steam or the dust discharged into the slag reforming pot 10 is collected by the dust collection hood 97, and the steam or the dust collected into the dust collection hood 97 is discharged into the common pipe 93 and may be respectively guided into the steam storage part 91 and the dust recovery part 92 and thus stored.

Figure 8:
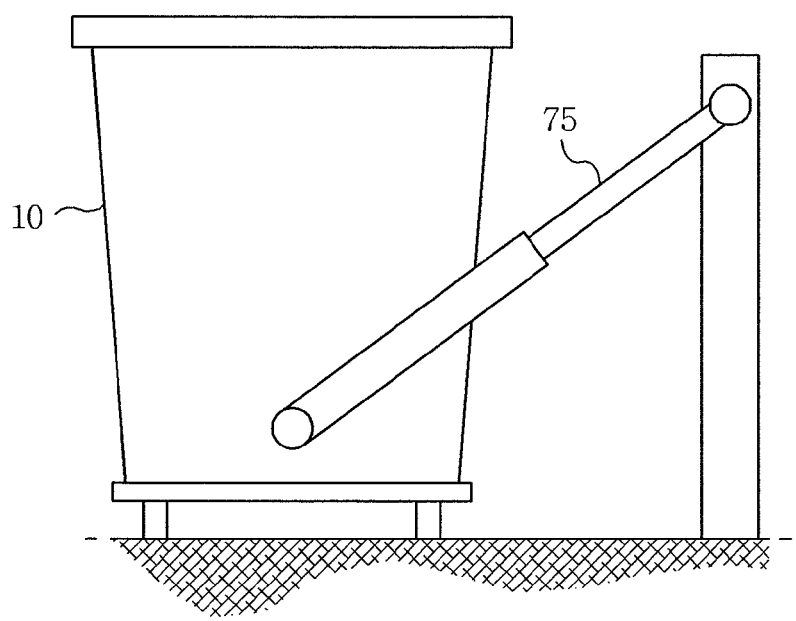
FIG. 8 shows a tilting device of the apparatus for recovering valuable metals and manufacturing multifunctional aggregate of FIG. 1.

FIG. 8 shows a tiling device of the apparatus for recovering valuable metals and manufacturing multifunctional aggregate of FIG. 1.

According to embodiments of the present invention, the apparatus 100 for recovering valuable metals and manufacturing multifunctional aggregate further comprises the tilting device 75 which tilts the slag reforming pot 10 so that the control-cooled solid slag in the slag reforming pot 10 is discharged to the outside.

When the molten slag is made into the solid slag having a porous structure using controlled cooling, the solid slag is discharged to the outside in order to crush and grind it.

With reference to FIG. 8, the tilting device 75 is hinged on the side surface of the slag reforming pot 10, so that the slag reforming pot 10 is tilted by means of power supplied from a predetermined power source (not shown), thereby discharging the solid slag to the outside.

Although the slag reforming pot 10 is tilted by means of the tilting device 75 which is fixed to the side surface of the slag reforming pot 10 in FIG. 8, the position of the tilting device 75 is not limited, and the tilting device 75 may be fixed to the bottom of the slag reforming pot 10 so that the slag reforming pot 10 may be moved up and down.

Also FIG. 8 shows an example using as the tilting device 75 a hydraulic tilting device for tilting the slag reforming pot 10 with the use of a hydraulic cylinder by means of hydraulic pressure supplied from a predetermined hydraulic source (not shown), but a motor using electric power may be utilized as the tilting device instead of the hydraulic mode.

Figure 9:
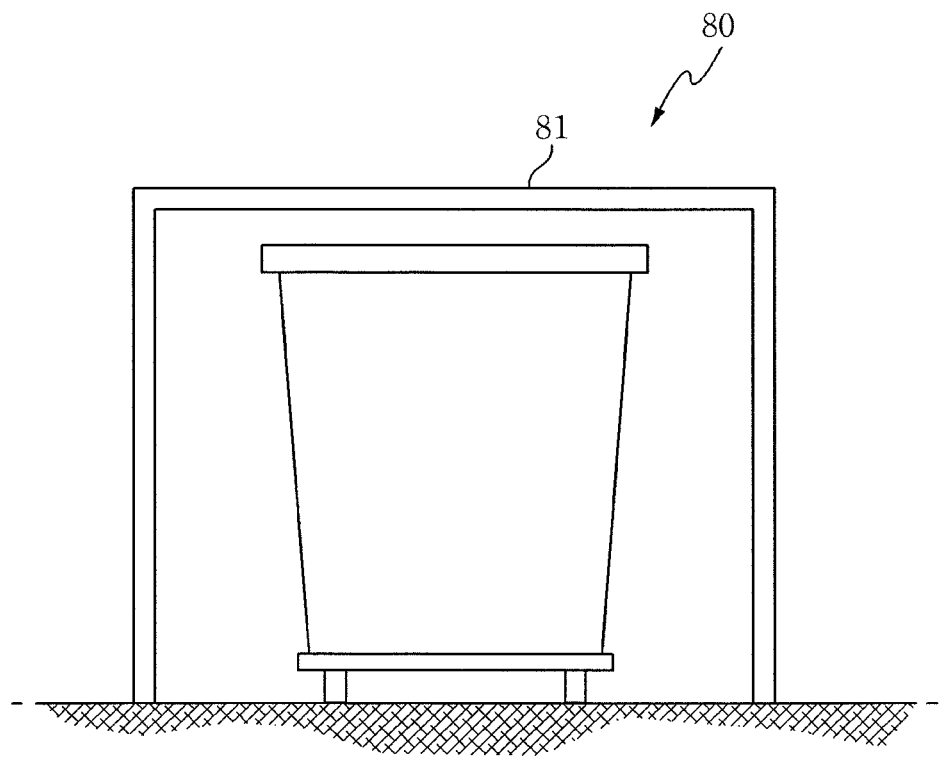
FIG. 9 shows a first example of a fusion preventer of the apparatus for recovering valuable metals and manufacturing multifunctional aggregate of FIG. 1.
Figure 10:
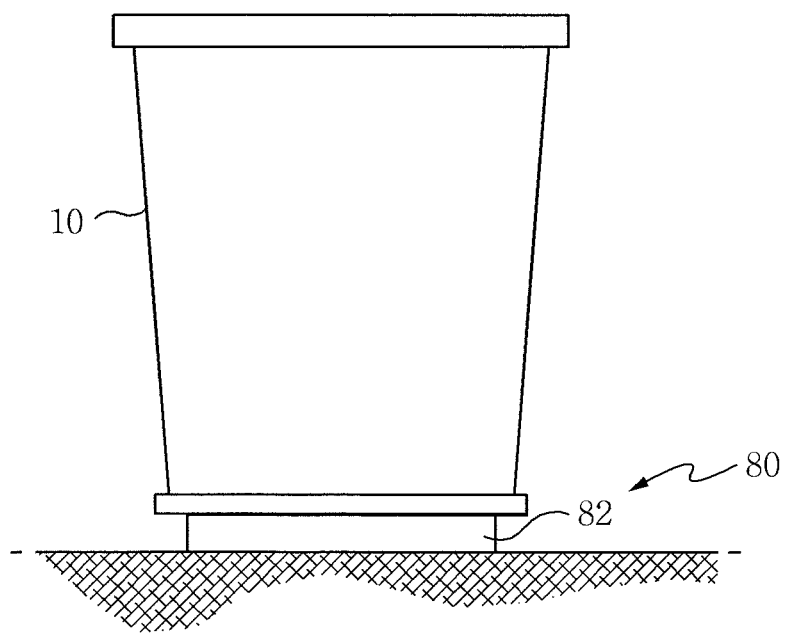
FIG. 10 shows a second example of a fusion preventer ion part of the apparatus for recovering valuable metals and manufacturing multifunctional aggregate of FIG. 1.
Figure 11:
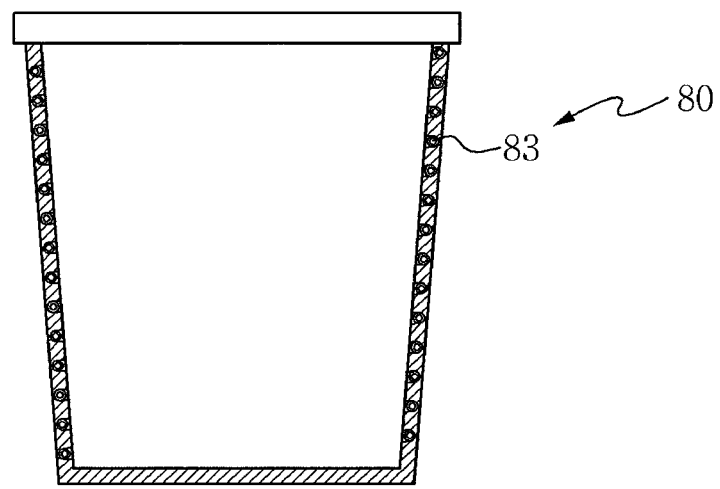
FIG. 11 shows a third example of a fusion preventer of the apparatus for recovering valuable metals and manufacturing multifunctional aggregate of FIG. 1.

FIG. 9 shows a first example of a fusion preventer of the apparatus for recovering valuable metals and manufacturing multifunctional aggregate of FIG. 1, FIG. 10 shows a second example of a fusion preventer of the apparatus for recovering valuable metals and manufacturing multifunctional aggregate of FIG. 1, and FIG. 11 shows a third example of a fusion preventer of the apparatus for recovering valuable metals and manufacturing multifunctional aggregate of FIG. 1.

According to embodiments of the present invention, the apparatus 100 for recovering valuable metals and manufacturing multifunctional aggregate further comprises the fusion preventer 80 provided outside the slag reforming pot 10 in order to prevent the solid slag which has been control-cooled in the slag reforming pot 10 from being fused to the inner wall of the slag reforming pot 10.

In the course of performing controlled cooling in the slag reforming pot 10, the molten slag may be fused to the inner wall of the slag reforming pot 10 while being cooled. In this case, even when the slag reforming pot 10 is tilted using the tilting device 75, the slag fused to the inner wall thereof cannot be discharged to the outside of the slag reforming pot 10. Hence, the fusion preventer 80 is employed so that the solid slag which has been control-cooled is not fused to the inner wall of the slag reforming pot 10.

With reference to FIG. 9, the fusion preventer 80 may be a high-frequency heater 81 for radiating high frequency onto the slag reforming pot 10 from the outside of the slag reforming pot 10. The high-frequency heating (high-frequency induction heating) used for heating metal is based on electromagnetic induction using high-frequency current, and accordingly the outer wall of the slag reforming pot 10 is heated by high frequency and heat is temporarily applied to the slag on the inner wall of the slag reforming pot 10 by the heat conducted to the inner wall, thereby preventing fusion.

In addition, with reference to FIG. 10, the fusion preventer 80 may be a vibration device 82 disposed under the slag reforming pot 10 so as to transfer small vibrations to the slag reforming pot 10. Furthermore, with reference to FIG. 11, the fusion preventer 80 may be a hot wire 83 embedded between the outer wall and the inner wall of the slag reforming pot 10 so as to heat the space between the inner wall and the outer wall of the slag reforming pot 10.

When the molten slag is converted into solid slag having a porous structure using controlled cooling, the solid slag is discharged to the outside using the tilting device 75 and then crushed and ground.

The solid slag having a porous structure has a small amount of valuable metal Fe and is easy to crush and grind owing to its porous structure. The average particle size of the crushed and ground solid slag is 50 mm or less, which is uniform.

Figure 12:
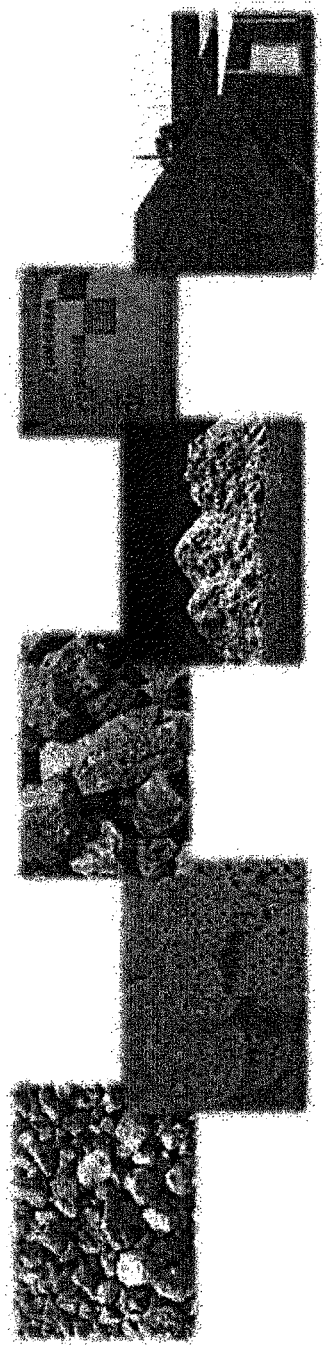
FIG. 12 shows the actual use examples of the multifunctional aggregate.

FIG. 12 shows the actual use examples of multifunctional aggregate.

The multifunctional aggregate thus manufactured is composed primarily of $CaO$, $Al_2O_3$, and $SiO_2$, and is utilized as shown in FIG. 12, and does not require an additional burning process when used as a cement material. Thus, when making cement, the use of fuel can be decreased and power consumption can be saved.

Also, cement resulting from this multifunctional aggregate does not require a burning process compared to when making conventional cement, and thus $CO_2$ emission can be decreased by about 40%.

Table 5 below shows the $CO_2$ reduction from using the slag.

TABLE 5

| | Typical Cement | Cement with at least 30% multifunctional aggregate (slag) | Decreased Amount | Decreased Rate |
|---|---|---|---|---|
| $CO_2$ emission (kg/ton) | 472.5 | 272.1 | 200.4 | 42 |
| Power · Energy (won/ton) | 311.1 | 190.4 | 120.7 | 39 |

As is apparent from Table 5, cement manufactured using the multifunctional aggregate from slag can decrease the $CO_2$ emission by about 40% compared to cement produced by conventional processes. Therefore, embodiments of the present invention can contribute in the effort to reduce $CO_2$ emission in the cement industries, with the inauguration of the Climate Change Center and the effectuation of cutting greenhouse gas emissions.

Also, the multifunctional aggregate has superior chemical resistance and high penetration resistance to chlorides ions. Furthermore, the multifunctional aggregate can effectively suppress ASR (Alkali Silica Reaction), and thus can be utilized for concrete constructions having high durability.

The method and apparatus as mentioned above can also be equivalently applied to the slag discharged from the converter.

According to another embodiment of the present invention, an apparatus for recovering valuable metals from slag and manufacturing multifunctional aggregate pertains to another example of the slag reforming pot, and a description thereof which overlaps with that of the first embodiment is omitted.

FIG. 13 shows a process of using another example of an apparatus for recovering valuable metals from slag and manufacturing multifunctional aggregate.

As shown in FIG. 13, molten slag is discharged into a slag pot 110 from a converter or an electric arc furnace, recovering valuable metals using a reducing agent is performed in the slag pot 110, and the molten slag positioned at the upper portion of the pot is discharged into a slag reforming pot 130 and then control-cooled, which is different from the first embodiment in which both the recovery of valuable metals and the controlled cooling are performed in the slag reforming pot 10.

Specifically, as shown in FIG. 13(b), a reducing agent such as carbon (C), aluminum (Al), etc., is supplied into the slag pot. As such, in order to enhance a stirring force to increase the reaction rate, a carrier gas may be supplied together. The reducing agent and the carrier gas are as described above and a description thereof is thus omitted.

After completion of the reduction, as shown in FIG. 13(c), the valuable metal iron (Fe) having high specific gravity is separated into the lower portion of the slag pot 110, and the molten slag is positioned at the upper portion thereof. Then, as shown in FIG. 13(d), the molten slag of the upper portion is discharged into the slag reforming pot 130 and the iron (Fe) remaining in the slag pot 110 is recovered.

The slag reforming pot 130 is used to control-cool the molten slag from which the valuable metal has been recovered, and a cooling unit is provided to form the molten slag from which the valuable metal has been recovered into a lightweight porous structure.

The cooling unit includes a plurality of nozzles 150 provided to the inner wall and the bottom of the slag reforming pot 130 so as to spray the carrier gas and the steam, and a mixture pipe 170 provided to communicate with the nozzles so that the carrier gas and the steam are supplied and then mixed.

The mixture pipe 170 may be connected in the form of a single line so that the supplied gas and steam are mixed and then sprayed via the nozzles 150.

Although not shown, the mixture pipe 170 may include a discharge pipe for discharging the condensed water produced due to heat loss of the steam and a flow rate regulator for regulating the amount and the pressure of gas and steam. The controlled cooling enables the molten slag to be made into solid slag having a porous structure so that the solid slag can be easily crushed even without the application of a large force.

When the molten slag is made into the solid slag having a porous structure using the controlled cooling, as shown in FIG. 13(e), the solid slag is crushed and ground. The solid slag having a porous structure has a small amount of Fe and is easy to crush and grind thanks to the porous structure thereof. The crushed and ground solid slag has a uniform particle size of 50 mm or less.

The crushed and ground slag may be separated into slag having high specific gravity and slag having low specific gravity using a flotation gravity separator 190. The slag having high specific gravity contains large amounts of FeO and MnO, and may be separated using repulsive mode magnetic separation, magnetic separation or flotation gravity separation.

The reason why the crushed and ground slag is separated into slag having high specific gravity and slag having low specific gravity is that the rate of recovery of valuable metals is increased and the specific gravity is decreased, thus ensuring usability as lightweight aggregate.

In embodiments of the present invention, the crushed and ground slag is separated into slag having high specific gravity and slag having low specific gravity using flotation gravity separation, and the flotation gravity separator 190 used therefor may have a shape as shown in FIG. 13(f).

When the crushed and ground slag is fed into the flotation gravity separator 190 via the inlet, the slag having a particle size of 50 mm or less passes through a mesh whereas the slag having a particle size more than 50 mm is discharged via the outlet.

The slag passed through the mesh is dropped to the lower portion of the flotation gravity separator 190, and the dropped slag is separated by the wave motion of supplied water such that the slag having low specific gravity with small amounts of FeO and MnO may float on the water whereas the slag having high specific gravity with large amounts of FeO and MnO settles in the water. The slag having low specific gravity which is floating on the water exceeds an overflow threshold formed horizontally and is thus discharged to the outside.

The discharged slag having low specific gravity is dried and then formed into multifunctional aggregate. In the case of the slag having high specific gravity and the slag having a particle size more than 50 mm, valuable metals are recovered therefrom using the reducing agent, after which the resulting slag can be formed into multifunctional aggregate.

According to a further embodiment of the present invention, an apparatus for recovering valuable metals from slag and manufacturing multifunctional aggregate pertains to examples of the reducing agent feeder, and a description thereof which overlaps with those of the first and the second embodiments is omitted.

Figure 14:
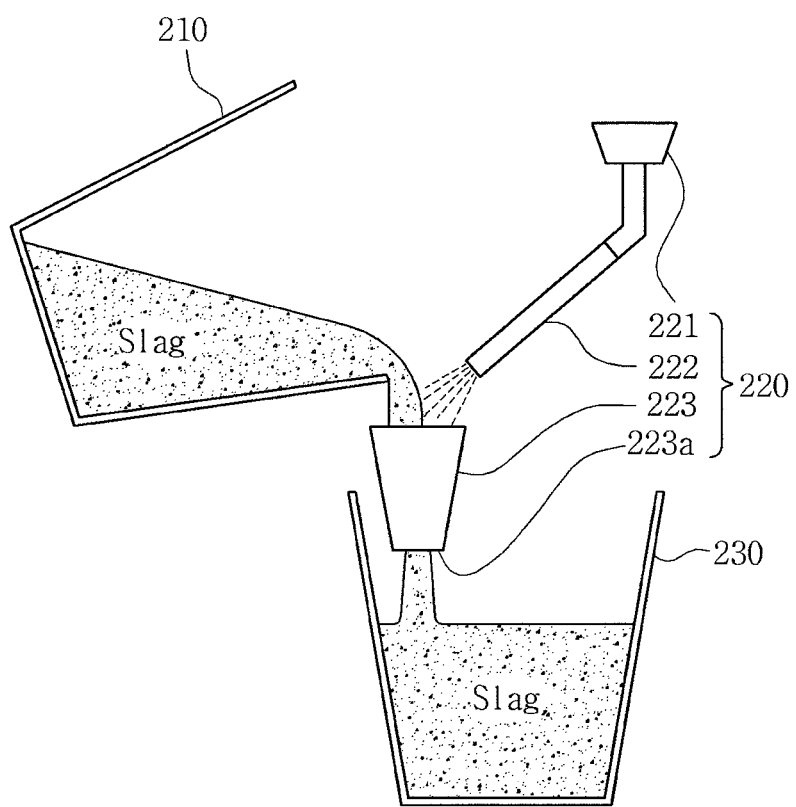
FIG. 14 shows another example of a reducing agent feeder according to embodiments of the present invention.
Figure 15:
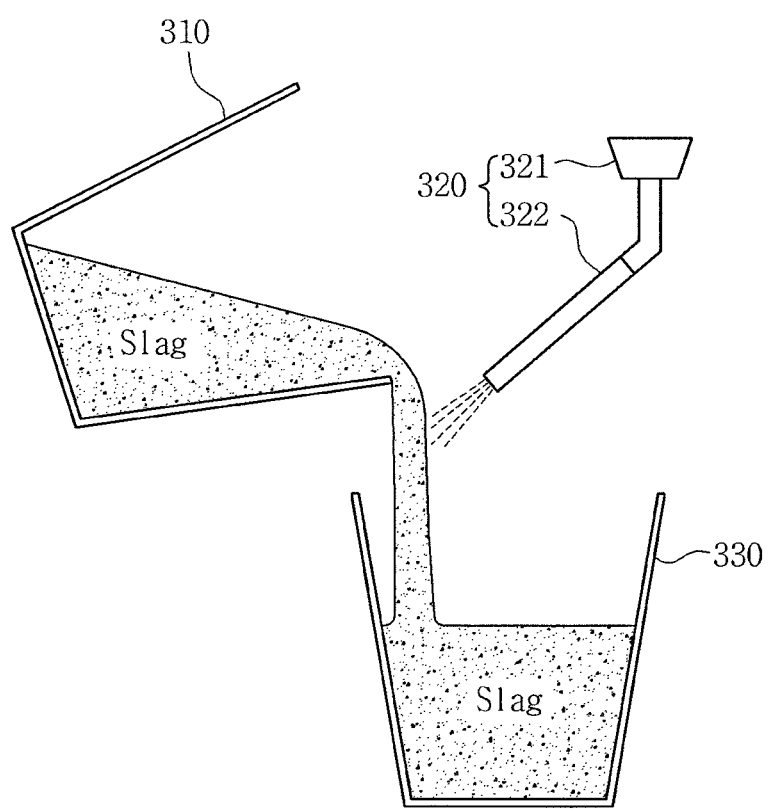
FIG. 15 shows a further example of a reducing agent feeder according to embodiments of the present invention.

FIG. 14 shows an example of a reducing agent feeder according to embodiments of the present invention, and FIG. 15 shows another example of a reducing agent feeder according to embodiments of the present invention.

In the examples of FIGS. 14 and 15, in order to recover valuable metals using a reducing agent in a slag reforming pot 230, 330, when the reducing agent is fed into the slag reforming pot 230, 330, it may be fed using an additional slag feed vessel 223 in lieu of directly feeding the reducing agent into the upper portion, side surface or lower portion of the slag reforming pot 230, 330, or alternatively the reducing agent may be directly fed in the course of feeding the slag into the slag reforming pot 330 via the slag pot 310 from the converter or the electric arc furnace, which is different from the first embodiment.

When the molten slag is discharged into the slag pot 210 from the converter or the electric arc furnace, the molten slag is discharged into the slag reforming pot 230 from the slag pot 210, which is the same as in the second embodiment, but the recovery of valuable metals using the reducing agent is performed not in the slag pot 210, 310 but in the slag reforming pot 230, 330, which is different from the second embodiment.

With reference to FIG. 14, the reducing agent feeder 220 includes a hopper 221, a reducing agent feed pipe 222 and a slag feed vessel 223.

The hopper 221 has a reducing agent such as carbon (C), aluminum (Al) or the like stored therein, and the reducing agent stored in the hopper 221 is fed into the slag feed vessel 223 via the reducing agent feed pipe 222.

The slag feed vessel 223 has a shape of funnel, and a lower opening 223a is formed in the bottom surface thereof so as to discharge the molten slag into the slag reforming pot 230. The slag feed vessel 223 is disposed between the slag pot 210 and the slag reforming pot 230, so that the molten slag discharged from the slag pot 210 is stored therein and then is discharged into the slag reforming pot 230.

When the molten slag is discharged into the slag feed vessel 223 from the slag pot 210, the reducing agent is added to the molten slag discharged into the slag feed vessel 223 via the reducing agent feed pipe 222. In this procedure, the reducing agent is directly added to the molten slag.

The period of time required to reduce valuable metal oxides of the molten slag in the funnel-shaped slag feed vessel 223 is increased, and the reaction surface area is enlarged, and thus the reduction reactivity is greatly enhanced, and the reduction time in the slag reforming pot 230 can be shortened, and the use of carrier gas can be decreased, thus preventing the temperature of the molten slag from decreasing.

In the case where the slag fed vessel 223 is applied according to embodiments of the present invention, it may play a role in stably guiding the direct addition of the reducing agent on the discharge route of molten slag between the slag pot 210 and the slag reforming pot 230, but the molten slag may be fused to the inner wall of the slag feed vessel 223 undesirably clogging the inner wall or the lower opening 223a.

In this case, only the slag feed vessel 223 is moved to the outside, and cooling water is sprinkled thereto so that the slag is quenched and thus solidified slag is removed, or predetermined impact or vibration may be applied to the slag feed vessel 223 transferred to the outside, thus removing the solidified slag.

According to another example of the reducing agent feeder, with reference to FIG. 15, the reducing agent feeder 320 includes a hopper 321 and a reducing agent feed pipe 322.

In this example, the slag feed vessel 223 of FIG. 14 is not used, unlike the above example. Hence, the reducing agent stored in the hopper 321 is not sprayed into the slag feed vessel 223 but is directly added to the molten slag discharged into the slag reforming pot 330 from the slag pot 310 by means of the reducing agent feed pipe 322.

In this procedure, the reducing agent is directly added to the molten slag, whereby the reduction reactivity is greatly increased, which is the same as in the example of FIG. 14.

After the reducing agent is fed into the slag reforming pot 230, 330 using the above reducing agent feeder 220, 320, the recovery of valuable metals and the controlled cooling are performed in the slag reforming pot 230, 330, which is the same as in the first embodiment, and thus a redundant description thereof is omitted.

Although the embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of making particles of slag, the method comprising:
providing molten slag in a container;
adding an inoculating agent to the molten slag to lower the melting point and specific gravity of the slag
subsequently to adding the inoculating agent, injecting steam into the molten slag to cool the molten slag and further injecting another gas into the molten slag to form bubbles in the molten slag, thereby forming porous solidified slag; and
breaking the porous solidified slag into particles of slag.

2. The method of claim 1, wherein the other gas comprises at least one selected from air, nitrogen gas and argon gas.

3. The method of claim 1, wherein prior to injecting, the steam and the other gas are mixed to form a gas mixture.

4. The method of claim 1, wherein the injection of steam is controlled such that the cooling rate of the molten slag is 5° C./sec to 50° C./sec.

5. The method of claim 1, wherein the particles of slag have a bulk density ranging from 0.6 g/cm$^3$ to 3.0 g/cm$^3$.

6. The method of claim 1, wherein the inoculating agent comprises at least one selected from the group consisting of aluminum, silicon, and quicklime.

7. The method of claim 1, further comprising, prior to injecting, exposing the molten slag to a reducing agent to recover a metal from the molten slag.

8. The method of claim 7, wherein exposing comprises supplying the reducing agent into the molten slag,
wherein the method comprises injecting carrier gas into the molten slag to accelerate mixing of the molten slag and the reducing agent while the reducing agent is supplied.

9. The method of claim 8, wherein the reducing agent is carried by the carrier gas and supplied into the molten slag.

10. The method of claim 7, wherein the reducing agent comprises at least one selected from the group consisting of carbon, aluminum, silicon, sodium, calcium, magnesium, and CO gas.

11. The method of claim 7, wherein the carrier gas comprises at least one selected from air, nitrogen gas and argon gas.

12. A method of making particles of slag, the method comprising:
- providing molten slag in a container;
- exposing the molten slag to a reducing agent to recover a metal from the molten slag;
- subsequently to exposing the molten slag to the reducing agent, injecting steam into the molten slag to cool the molten slag and further injecting another gas into the molten slag to form bubbles in the molten slag, thereby forming porous solidified slag; and
- breaking the porous solidified slag into particles of slag,
- wherein exposing and cooling of the molten slag are performed in the same container.

13. A method of making particles of slag, the method comprising:
- providing molten slag in a container;
- exposing the molten slag to a reducing agent to recover a metal from the molten slag;
- subsequently to exposing the molten slag to the reducing agent, injecting steam into the molten slag to cool the molten slag and further injecting another gas into the molten slag to form bubbles in the molten slag, thereby forming porous solidified slag; and
- breaking the porous solidified slag into particles of slag,
- wherein the container comprises a porous plug, wherein the steam or the gas is introduced into the container through the porous plug.

* * * * *